(12) United States Patent
Friedberger et al.

(10) Patent No.: US 12,411,152 B2
(45) Date of Patent: Sep. 9, 2025

(54) METHOD AND SYSTEM FOR DETERMINING FLOW PROPERTIES OF A FLUID FLOWING ALONG A SURFACE

(71) Applicants: Airbus Operations GmbH, Hamburg (DE); Airbus SAS, Blagnac (FR); Ostbayerische Technische Hochschule Regensburg, Regensburg (DE)

(72) Inventors: Alois Friedberger, Hamburg (DE); Bruno Stefes, Hamburg (DE); Dominik Berndt, Regensburg (DE); Rupert Schreiner, Regensburg (DE)

(73) Assignees: Airbus Operations GmbH, Hamburg (DE); Airbus SAS, Blagnac (FR); Ostbayerische Technische Hochschule, Regensburg (DE)

( * ) Notice: Subject to any disclaimer, the term of this patent is extended or adjusted under 35 U.S.C. 154(b) by 160 days.

(21) Appl. No.: 18/188,688

(22) Filed: Mar. 23, 2023

(65) Prior Publication Data

US 2023/0305035 A1    Sep. 28, 2023

(30) Foreign Application Priority Data

Mar. 25, 2022 (EP) .................................... 22164393

(51) Int. Cl.
    *G01P 5/12*    (2006.01)
(52) U.S. Cl.
    CPC ...................... *G01P 5/12* (2013.01)
(58) Field of Classification Search
    CPC .......... G01M 9/06; G01M 9/04; G01M 9/065; G01M 10/00; G01M 9/062; G01M 1/127;
    (Continued)

(56) References Cited

U.S. PATENT DOCUMENTS

| | | |
|---|---|---|
| 4,727,751 A | 3/1988 | Holmes et al. |
| 5,335,555 A | 8/1994 | Guizot |

(Continued)

FOREIGN PATENT DOCUMENTS

| | | | |
|---|---|---|---|
| DE | 4222458 A1 * | 1/1994 | ............... G01F 1/68 |
| FR | 2944356 A1 * | 10/2010 | ............. B64D 43/02 |

(Continued)

OTHER PUBLICATIONS

European Search Report for European Patent Application No. 22164393.5 dated Sep. 9, 2022; priority document.

(Continued)

*Primary Examiner* — Andre J Allen
(74) *Attorney, Agent, or Firm* — Greer, Burns & Crain, Ltd.

(57) ABSTRACT

A method for determining flow properties of a fluid flowing along a surface by: modulating the current through a heating element of a thermal flow sensor located on the surface with at least one modulation frequency, thereby emitting a thermal wave into the fluid flowing along the surface having a penetration depth inversely proportional to the modulation frequency; measuring an amplitude of a voltage across the heating element at the third harmonic of the at least one modulation frequency, the voltage depending on the thermal conductivity and the volumetric heat capacity of the fluid flowing along the surface; determining a flow velocity at the penetration depth from the attenuation value of the determined amplitude of the voltage; and estimating whether the flow at the penetration depth is laminar or turbulent on the basis of the determined flow velocity. Also, a system and an aircraft with such a system.

17 Claims, 3 Drawing Sheets

(58) Field of Classification Search
CPC .... G01M 17/02; G01M 17/04; G01M 5/0016; G01M 5/005; G01M 9/02; G01M 99/008; G01M 9/08; B64D 43/02; B64D 15/20; B64D 43/00; B64D 15/12; B64D 1/18; B64D 1/20; B64D 15/16; B64D 15/22; B64D 2033/0286; B64D 33/02; B64D 45/00; B64D 33/08; G01P 13/025; G01P 5/165; G01P 13/02; G01P 5/14; G01P 5/16; G01P 5/00; G01P 5/02; G01P 5/12; G01P 5/245; G01P 21/025; G01P 5/07; G01P 5/04; G01P 1/02; G01P 1/08; G01P 5/10; G01P 5/06; G01P 5/18; G01P 5/26; G01P 13/045; G01P 5/005; G01P 5/08; G01P 21/00; G01P 3/62; G01P 5/175; G01P 5/24; G01P 15/00; G01P 15/036; G01P 5/006; G01P 5/083; G01P 5/086; G01P 5/241; G01P 7/00; G01P 5/001
USPC ...................................................... 73/170.02
See application file for complete search history.

(56) References Cited

U.S. PATENT DOCUMENTS

| | | | |
|---|---|---|---|
| 6,234,016 B1 * | 5/2001 | Bonne | G01F 1/6884 73/204.26 |
| 8,959,993 B2 | 2/2015 | Guichard | |
| 10,254,141 B2 * | 4/2019 | Kurata | G01F 1/6842 |
| 11,650,088 B2 * | 5/2023 | Ciesla | G01F 1/6888 73/204.25 |
| 2014/0294041 A1 | 10/2014 | Zhang et al. | |

FOREIGN PATENT DOCUMENTS

| | | | | |
|---|---|---|---|---|
| GB | 2287792 A | | 9/1995 | |
| JP | 5479641 B1 * | | 4/2014 | ........... G01F 1/6847 |
| WO | WO-2024147736 A1 * | | 7/2024 | ........... G01F 1/6845 |

OTHER PUBLICATIONS

C. Yang et al., "Monolithic Flow Sensor for Measuring Millilitre per Minute Liquid Flow" Sensors and Actuators A: Physical, Elseview BV, NL, vol. A33, No. 3, Jun. 1, 1992; pp. 143-153.

B. W. Van Oudheusden et al., "Silicon Thermal Flow Sensors" Sensors and Actuators A: Physical, Elseview BV, NL, vol. 30 No. 1-2, Jan. 1, 1992; pp. 5-26.

W. Hodges et al., "A Multi-Frequency 3w Method for Tracking Moving Phase Boundaries" Rev. Sci. Instr., No. 90, 2019; p. 094903.

Ralf E. Bernhardsgrütter et al., Robust and Flexible Thermal Sensor Using the 3-Omega-Method to Investigate Thermal Properties of Fluids, 2019 20th International Conference on Solid-State Sensors, Actuators and Microsystems & Eurosensors XXXIII (Transducers & Eurosensors XXXIII), IEEE, Jun. 23, 2019, pp. 1909-1912, XP033600146, DOI: 10.1109/TRANSDUCES.2019.8808543.

Office Action from corresponding European application No. 22164393.5 dated Jun. 17, 2025.

* cited by examiner

METHOD AND SYSTEM FOR DETERMINING FLOW PROPERTIES OF A FLUID FLOWING ALONG A SURFACE

CROSS-REFERENCES TO RELATED APPLICATIONS

This application claims the benefit of European Patent Application Number 22164393.5, filed on Mar. 25, 2022, the entire disclosure of which is incorporated herein by way of reference.

FIELD OF THE INVENTION

The invention relates to a method as well as to a system for determining flow properties of a fluid flowing along a surface. The invention is furthermore concerned with a use of such a method and with an aircraft containing such a system.

BACKGROUND OF THE INVENTION

Conventional thermal flow sensors that are known so far, e.g. hot-wire or surface hot-film sensors work in the time domain. In this context, the sensor is usually operated by pulsed or continuous (constant current, constant temperature) excitation. In addition, there is a distinction between anemometer and calorimeter mode of operation. In general, this procedure works very fast. However, for any description that goes beyond the magnitude and direction of the flow velocity a transformation in the frequency domain is necessary and the data post-processing becomes very time consuming.

For example, the document "A multi-frequency 3 w method for tracking moving phase boundaries," by W. Hodges and C. Dames, published in Rev. Sci. Instr., Nr. 90, p. 094903, 2019, describes a technique to track the location of the phase boundary between air and dielectric oil in a quasistatic operation.

For aviation flight tests, the hot-wire and hot-film technology is basically not suitable because of the very high likelihood of the sensors to be damaged due to adverse ambient conditions like rain, snow, dust and the very complex system installation and calibration requirements for the hot-wire and hot-film technology. Therefore, the detection of the laminar-turbulent transition of boundary layers for a flight test is conventionally done using an additionally installed thermal camera. Though using the thermal camera restricts the flight test conditions, such that only being operable during sunshine. For visualization of regions of flow detachment during flight tests, hundreds of flow cones have to be installed on the surface of the wing. This process requires a high effort in time for installation and provides only a restricted information during flight tests.

However, there are no thermal flow sensors, which are both robust in operation and offering a reduced effort for integration onto the surface of the aircraft.

SUMMARY OF THE INVENTION

Aspects of the invention may provide solutions for determining fluid parameters about a fluid flow easier in flight tests.

According to the invention, this problem is solved in each case by the subject matters of various embodiments described herein.

According to a first aspect of the invention, a method for determining flow properties of a fluid flowing along a surface is provided. The method comprises a step of modulating the current through a heating element of a thermal flow sensor located on the surface with at least one modulation frequency, thereby emitting a thermal wave into the fluid flowing along the surface having a penetration depth inversely proportional to the modulation frequency, and a step of measuring an amplitude of a voltage across the heating element at the third harmonic of the at least one modulation frequency, the voltage depending on the thermal conductivity and the volumetric heat capacity of the fluid flowing along the surface. The method further comprises a step of determining a flow velocity at the penetration depth from the attenuation value of the determined amplitude of the voltage, and a step of estimating whether the flow at the penetration depth is laminar or turbulent on the basis of the determined flow velocity.

According to a second aspect of the invention, a use of the method according to the invention for determining flow properties of air flowing along a surface of an aircraft is provided. In particular a use of the method according to the invention for determining flow properties of air flowing along an airfoil of an aircraft is provided.

According to a third aspect of the invention, a system for determining flow properties of a fluid flowing along a surface is provided. The system comprises a thermal flow sensor having a substrate and a heating element mounted onto the substrate, the thermal flow sensor being located on the surface, and a power supply electronically coupled to the thermal flow sensor and configured to modulate the current through a heating element of a thermal flow sensor located on the surface with at least one modulation frequency, thereby emitting a thermal wave into the fluid flowing along the surface having a penetration depth inversely proportional to the modulation frequency. Further, the system comprises a measurement assembly electronically coupled to the thermal flow sensor and configured to measure an amplitude of a voltage across the heating element at the third harmonic of the at least one modulation frequency, the voltage depending on the thermal conductivity and the volumetric heat capacity of the fluid flowing along the surface, to determine a flow velocity at the penetration depth from the attenuation value of the measured amplitude of the voltage, and to estimate whether the flow at the penetration depth is laminar or turbulent on the basis of the determined flow velocity.

According to a fourth aspect of the invention, an aircraft comprising a system according to the invention and a surface on which the thermal flow sensor of the system is located. In particular instead of the surface, the aircraft comprises an airfoil on which the thermal flow sensor of the system is located.

A fundamental concept of the invention is modulating the current through a heating element of the thermal flow sensor with a modulation signal in the frequency domain for detecting the laminar-turbulent boundary layer transition of fluids flowing along surfaces and/or for the identification of flow detachment areas on such aerodynamic surfaces. Thereby, the modulation signal that means an excitation signal is applied to the heating element having one or more excitation frequencies. Due to the current through the heating element a thermal wave which is emitted by the heating element penetrates the fluid, wherein the penetration depth of the thermal wave into the fluid is dependent on the modulation frequency, in particular inversely dependent on the modulation frequency. The voltage which is present across the heating element is measured and corresponds to an oscillating voltage, wherein the amplitude of the voltage is the maximum absolute value of the difference from a mean voltage value. Thereby, the so-called 3-omega ($\omega$) method is applied. The measured voltage comprises a voltage term at the third harmonic of the modulation frequency. As a consequence of heat convection, the amplitude of the voltage at the third harmonic of the modulation frequency is reduced in dependency of the flow velocity of the fluid at the corresponding penetration depth. The penetration depth represents the perpendicular distance from the heating element with regard to the surface. Based on the reduction of the amplitude compared to an amplitude of the voltage at the maximum flow velocity of the fluid, that means at the flow velocity away from the surface, it is determined whether the flow velocity profile of the flowing fluid is laminar or turbulent.

In the 3-omega ($\omega$) method, a heating element, e.g. a metal wire, placed on a surface of a sample is used as both a heater and a thermometer. The production of such a metal wire is mostly done by microstructuring and thermal evaporation. A periodic current with an angular frequency $\omega$ is applied to the metal wire, which can be expressed mathematically by $$I(t)=I_0 \cdot \cos(\omega t). \quad \text{[EQ. 1]}$$

Thereby, the heating element is powered by a power signal P(t), which causes the temperature of the metal wire and also of the heating element to change at the same frequency as the power signal:

$$T(t)=T_0(t)+\Delta T \cdot \cos(2\omega t+\varphi). \quad \text{[EQ. 2]}$$

The amplitude $\Delta T$ and the phase shift $\varphi$ with respect to the power signal depend on the thermal conductivity of the material and the angular frequency $\omega$. $T_0$ is the zero position of the temperature oscillation and depends on power and coupling of the sample to the environment. The temperature oscillation of the heating element leads to a resistance oscillation of the heating element, which is expressed mathematically by:

$$R(t)=R_0 \cdot [1+\alpha \cdot (T(t)-T_0(t))]=R_0+\Delta R \cdot [\cos(2\omega t+\varphi)] \quad \text{[EQ. 3]}$$

with $$\Delta R=\alpha \cdot R_0 \cdot \Delta T. \quad \text{[EQ. 4]}$$

In the above equations, $\alpha$ is the temperature coefficient of the electrical resistance of the heating element, $R_0$ is the resistance at temperature $T_0$, and $\Delta R$ is the amplitude of the resistance oscillation. From this relationship and the equation defining the periodic current I(t), the voltage U(t) measured across the heating element can be calculated to:

$$U(t) = \quad \text{[EQ. 5]}$$
$$R(t) \cdot I(t) = R_0 I_0 \cdot \cos(\omega t) + 0.5 \cdot \Delta R I_0 \cdot [\cos(3\omega t + \varphi) + \cos(\omega t + \varphi)].$$

Accordingly, an equation term with the frequency $3\omega$ can be observed in the voltage signal, which has the amplitude:

$$U_{3\omega}=0.5 \cdot \Delta R \cdot I_0=0.5 \cdot \alpha \cdot R_0 \cdot \Delta T \cdot I_0 \quad \text{[EQ. 6]}$$

The amplitude $U_{3\omega}$ of the $3\omega$-term is proportional to the temperature amplitude $\Delta T$ of the heating element and is thus suitable for measuring the temperature amplitude. In order not to lose the phase information of the temperature oscillation, one can consider $\Delta T$ as a complex quantity by multiplying the phase factor to it.

In the case of no convection at the heating element, that means the heating element is in contact to a solid body or a resting fluid, the amplitude of the $3\omega$-term and the phase shift $\varphi$ contain information about the thermal properties of the material (solid or fluid) surrounding the heating element, such as the thermal conductivity or the thermal diffusion constant. For forced convection in the form of a flowing fluid, the amplitude of the $3\omega$-voltage is proportional to the flow velocity of the fluid.

For a semi-infinitely expanded bulk material and an infinitely narrow heating element, there is the following approximation:

$$\Delta T(r) = \frac{P}{\pi l \lambda}\left[\frac{1}{2}\ln\left(\frac{D}{r^2}\right) - \frac{1}{2}\ln(\omega) + \ln(2) - \gamma - i\frac{\pi}{4}\right]. \quad \text{[EQ. 7]}$$

Wherein P is the power, l is the length of the metal wire, $\lambda$ is the thermal conductivity of the sample, $\gamma$ is the Euler's constant, and D is the thermal diffusivity. In particular, the real part of $\Delta T$ is proportional to the logarithm of the frequency and the thermal conductivity is a proportionality factor. Thus, if the temperature oscillation is measured at different frequencies, the thermal conductivity of the sample can be determined.

A particular advantage in the solution according to an aspect of the invention is that modulating the current with one or more certain modulation frequencies combined with a direct signal processing can accelerate the data analysis process, since extensive data post processing in the conventional way to obtain important information like the laminar-turbulent transition or separation point or like the intensity of turbulence can be skipped. Additionally, the power consumption of the thermal flow sensor according to the invention is lower than with sensors in continuous time-domain operation. Further, the present invention has a simpler mechanical setup providing higher robustness compared to the known sensor setups for flight tests. Moreover, the present thermal flow sensor according to the invention can detect un-stationary flow phenomena.

Advantageous embodiments and further developments emerge from the description with reference to the figures.

According to some aspects of the method according to the invention, the step of estimating whether the flow at the penetration depth is laminar or turbulent includes comparing the determined flow velocity with a measurement value of a reference sensor or with a calibration value in quiescent atmosphere. Thus, it can be determined easily and quick whether the flow is laminar or turbulent without further calculating effort, thereby comparing the determined flow velocity to a value measured under known or controlled circumstances.

According to some further aspects of the method according to the invention, the current through a heating element of a thermal flow sensor located on the surface is modulated with a plurality of modulation frequencies and wherein a plurality of amplitudes of the voltage across the heating element are measured at the respective third harmonics of the plurality of modulation frequencies. Thus, a plurality of amplitudes can be measured under the same circumstances in the same environment and can be compared to each other for estimating more precisely whether the flow at the penetration depth is laminar or turbulent.

According to some further aspects of the method according to the invention, a flow velocity profile is determined from flow velocities at different penetration depths on the basis of the attenuation value of the plurality of measured amplitudes. Therefore, the flow velocity profile can be approximated when comparing one measured amplitude of the voltage with for instance two other amplitudes measured at two further modulation frequencies each being different from the two other modulation frequencies. Thus, a parabolic profile near the surface could represent a laminar flow profile of the fluid, while a linear profile near the surface could represent a turbulent flow profile of the fluid.

According to some further aspects of the method according to the invention, the step of estimating whether the flow at the penetration depth is laminar or turbulent includes estimating a transition point between laminar and turbulent flow in the flow velocity profile. With this, the flow can be kept in the needed flow velocity profile, that means either in laminar or turbulent flow, by choosing a flow velocity of the fluid to avoid the transition point.

According to some further aspects of the method according to the invention, estimating a transition point between laminar and turbulent flow in the flow velocity profile includes deriving a threshold of the wall shear stress vector near the surface.

According to some further aspects of the method according to the invention, the current through the heating element is modulated with the plurality of modulation frequencies simultaneously. This can accelerate the data processing of the measuring, determining and estimating steps.

According to some further aspects of the method according to the invention, the modulation frequency of the current through the heating element is swept through the plurality of modulation frequencies. Therefore, when decreasing the modulation frequency from a certain modulation frequency, the penetration depth increases until the heat emitted by the heating element is removed by the flow such that an attenuation of the amplitude of the voltage can be detected. With this, it can be ensured that at least one detectable change of the amplitude is measured.

According to some further aspects of the method according to the invention, measuring the amplitude of the voltage across the heating element includes using a lock-in amplifier at the third harmonic of the at least one modulation frequency. That means in the step of measuring the amplitude, the voltage term which represents the third harmonic of the modulation frequency is filtered by a measuring device that is configured as a lock-in amplifier or that comprises a lock-in amplifier. With a lock-in amplifier, it is possible to filter out the 3ω-term of the measured voltage and the phase dependence.

A lock-in amplifier performs a multiplication of its input with a reference signal, also sometimes called down-mixing or heterodyne/homodyne detection, and then applies an adjustable low-pass filter to the result. This process is termed demodulation or phase-sensitive detection and isolates the signal at the frequency of interest from all other frequency components. The reference signal is either generated by the lock-in amplifier itself or provided to the lock-in amplifier and the sensing system by an external source. The reference signal is usually a sine wave but could have other forms, too. Demodulation with a pure sine wave enables selective measurement at the fundamental frequency or any of its harmonics. Some instruments alternatively use a square wave which also captures all odd harmonics of the signal and, therefore, potentially introducing systematic measurement errors.

According to some further aspects of the method according to the invention, the modulation pattern of the current through the heating element is a sawtooth modulation, a triangular modulation, a square-wave modulation, a stepped modulation or a sinusoidal modulation. With some modulation patterns additional advantages can be achieved. For instance, with the square-wave modulation the amplitude of the voltage across the heating element at the third harmonic of the modulation frequency can be 33% larger than a sinusoidal modulation. Furthermore, the thermal flow sensor can have a larger sensor resolution with the square-wave modulation. Alternatively or additional, an electrical circuit design can be easier, wherein for example a super-clean sinusoidal function would not be necessary.

According to some embodiments of the system according to the invention, the heating element is formed as at least one conductive or semiconductive film partially or wholly coating the substrate of the thermal flow sensor.

According to some further embodiments of the system according to the invention, the substrate of the thermal flow sensor comprises polyimide with a thickness of 100 μm or less. In particular, the substrate of the thermal flow sensor comprises Kapton CR with a thickness of 100 μm or less. Furthermore, the substrate can have a thermal conductivity of 0.3 W/mK or less. Alternatively, the thermal flow sensor comprises polybutylene succinate, in particular aerogel, or a similar material. With this, the thermal flow sensor cannot affect the flow near the thermal flow sensor.

According to some further embodiments of the system according to the invention, the thermal flow sensor further includes a protection layer on top of the heating element, in particular one of a diamond-like layer, a glass-filled epoxy layer and a glass-fiber reinforced plastic layer. Thus, the mechanical robustness of the thermal flow sensor can be increased.

The above embodiments and further developments can be combined with one another arbitrarily, as far as appropriate. Further possible configurations, developments and implementations of the invention are also combinations of features of the invention described above or below for the exemplary embodiments that are not explicitly cited. In particular, a person skilled in the art will also add individual aspects as improvements or additions to the respective basic form of the present invention.

BRIEF DESCRIPTION OF THE DRAWINGS

The present invention is explained more specifically below on the basis of the exemplary embodiments indicated in the schematic figures, in which.

Figure 1:
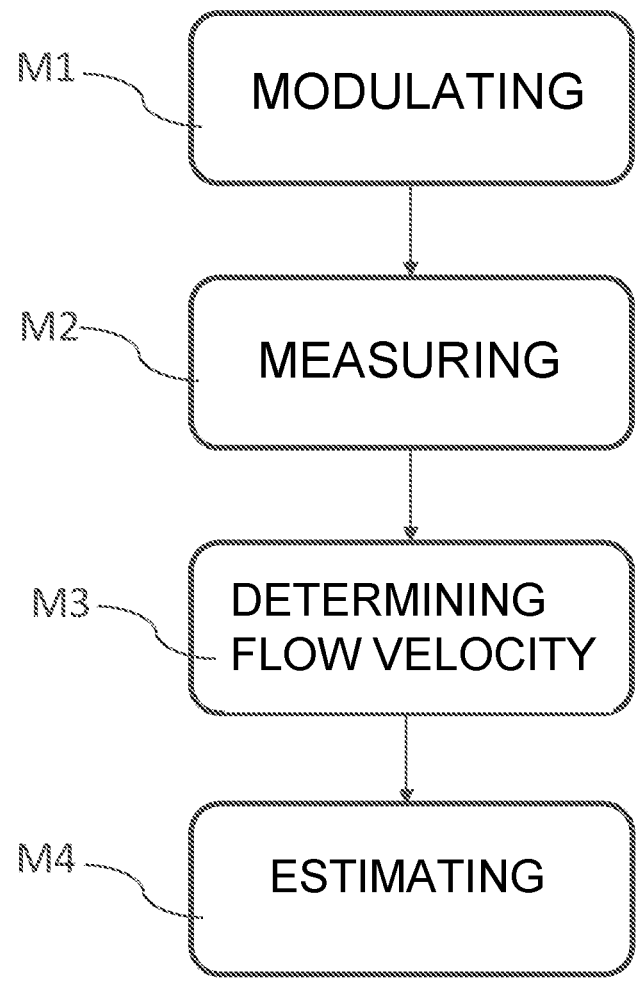
FIG. 1 shows a flow chart for a method for determining flow properties of a fluid flowing along a surface according to one embodiment of the invention.

The accompanying figures are intended to convey a further understanding of the embodiments of the invention. They illustrate embodiments and are used in conjunction with the description to explain principles and concepts of the invention. Other embodiments and many of the cited advantages emerge in light of the drawings. The elements of the drawings are not necessarily shown to scale in relation to one another. Direction-indicating terminology such as for example "at the top", "at the bottom", "on the left", "on the right", "above", "below", "horizontally", "vertically", "at the front", "at the rear" and similar statements are merely used for explanatory purposes and do not serve to restrict the generality to specific configurations as shown in the figures.

In the figures of the drawing, elements, features and components that are the same, have the same function and have the same effect are each provided with the same reference signs—unless explained otherwise.

DETAILED DESCRIPTION

FIG. 1 shows a flow chart for a method M for determining flow properties of a fluid flowing along a surface 2.

The method M comprises a step of modulating M1 the current through a heating element 5 of a thermal flow sensor 3 located on the surface 2 with at least one modulation frequency $\omega$. In this example, the modulation pattern is a sinusoidal modulation with at least one excitation frequency $\omega$. Thereby the heating element 5 emits a thermal wave 7 into the fluid flowing along the surface 2, wherein the thermal wave 7 has a penetration depth L inversely proportional to the modulation frequency $\omega$: $L=\sqrt{(D/\omega)}$, wherein D is the thermal diffusivity. Thus, at low frequencies $\omega$, for example $\omega<100$ Hz, the thermal wave 7 penetrates deeply into the fluid and the higher the frequency $\omega$ the lower the penetration depth L.

In particular, the current through the heating element 5 of the thermal flow sensor 3 located on the surface 2 is modulated with a plurality of modulation frequencies $\omega$. Exemplarily, the modulation signal of the current through the heating element 5 is swept through the plurality of modulation frequencies $\omega$. Additionally, the modulation, also called the excitation signal, can be configured to have a constant modulation amplitude, but is not limited to only one modulation amplitude.

As a result of the modulation, a thermal resistance of the heating element 5 oscillates around an average resistance, such that the amplitude of the thermal resistance changes between its maximum and the average resistance with twice the modulation frequency $\omega$.

Alternatively, the excitation signal is configured as a signal in the form of a pulsed mode with one single pulse of 100 ms and with a duty cycle of 10%. Of course, other excitation signals come into question as well.

Moreover, the method M includes a step of measuring M2 an amplitude $U3\omega$ of a voltage U across the heating element 5 at the third harmonic $3\omega$ of each of the plurality of modulation frequencies $\omega$. Thereby, the voltage U depends on the thermal conductivity and the volumetric heat capacity of the fluid flowing along the surface 2. That means a plurality of amplitudes $U3\omega$ of the voltage U across the heating element 5 can be measured at the respective third harmonics $3\omega$ of the plurality of modulation frequencies $\omega$.

The method M further comprises a step of determining M3 a flow velocity VL at the penetration depth L from the attenuation value of the determined amplitude $U3\omega$ of the voltage U. The amplitude $U3\omega$ is linearly proportional to the fluid velocity VL, in particular with a decreasing amplitude $U3\omega$ when the fluid velocity VL is increasing. Thus, a flow velocity profile can be determined from the plurality of amplitudes $U3\omega$ each amplitude $U3\omega$ measured at a different modulation frequency $\omega$. Furthermore, the determined flow velocities VL correspond to different penetration depths L.

Figures 3A, 3B:
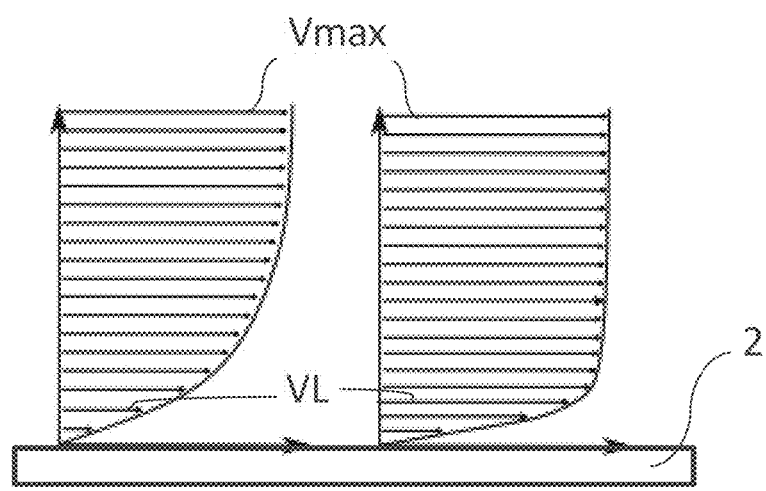
FIG. 3A shows a laminar flow velocity profile of a fluid flowing along a surface.
FIG. 3B shows a turbulent flow velocity profile of a fluid flowing along a surface.

Further, the method M includes a step of estimating M4 whether the flow at the penetration depth L is laminar or turbulent on the basis of the determined flow velocity VL. That means that the flow velocity profile can be approximated by combining the fluid velocities VL at their corresponding penetration depth L, as it is illustrated in FIG. 3A and FIG. 3B for example. Optionally, the step of estimating M4 can include estimating a transition point between laminar and turbulent flow in the flow velocity profile. Further optionally, estimating a transition point between laminar and turbulent flow in the flow velocity profile can include deriving a threshold of the wall shear stress vector $T\omega$ near the surface 2. For instance, three flow velocities VL can be combined for defining the wall shear stress vector $T\omega$ which is proportional to the ratio from the fluid velocity VL parallel to the surface 2 and the parallel distance (corresponding to L) from the heating element 5.

Figure 2:
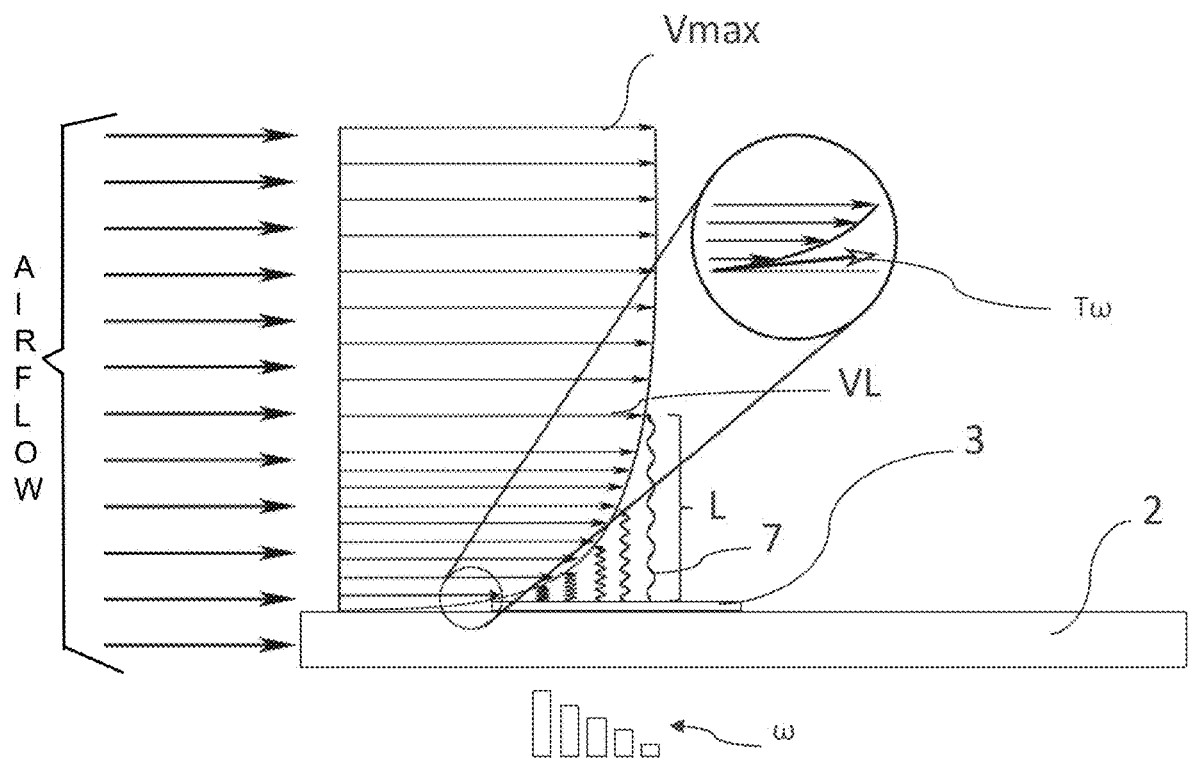
FIG. 2 shows a schematic illustration of a use of a method according to the invention for determining flow properties of air flowing along a surface of an aircraft also showing a detail extract of the flow profile of the air near the surface according to a further embodiment of the invention.

FIG. 2 shows a schematic illustration of a use of a method M according to the invention for determining flow properties of air flowing along a surface 2 of an aircraft also showing a detail extract of the flow profile of the air near the surface 2.

A parallel air flow impinges on the surface 2, e.g. on the surface 2 of an aircraft, initially creating a laminar flow profile with a maximum air flow velocity Vmax away from the surface 2. The air flow velocity exactly on the surface 2 is zero. Between the surface (flow velocity zero) and the maximum air flow velocity Vmax an air flow velocity VL at the penetration depth L is to be determined.

In this example, the use of the method M comprises the surface 2 and a thermal flow sensor 3 mounted onto the surface 2. Thereby, the current through a heating element of the thermal flow sensor 3 is modulated with the plurality of modulation frequencies $\omega$ simultaneously. Exemplarily illustrated in FIG. 2, the thermal flow sensor 3 emits thermal waves 7 into the air flow. Each of the illustrated thermal waves 7 corresponds to one of the plurality of the modulation frequencies $\omega$, and also to a certain penetration depth L. The thermal wave 7 has a penetration depth L inversely proportional to the modulation frequency $\omega$. Thus, a high modulation frequency $\omega$ results in a small thermal penetration depth L, whereas a low modulation frequency $\omega$ leads to a high thermal penetration depth L. This means that different modulation frequencies $\omega$ are attenuated by the air flow to different levels depending on the flow velocity profile. From this correlation the flow velocity profile can be deduced and, as a consequence, it can be determined whether the flow velocity profile is laminar or turbulent. Further, from the slope of the flow velocity profile in the wall-near region a wall shear stress vector $T\omega$ can be derived, as it is illustrated in the detail extract. Additionally, the general shape of the flow velocity profile is different for laminar and turbulent boundary layers.

FIGS. 3A and 3B each show a flow velocity profile of a fluid flowing along a surface 2, wherein FIG. 3A represents a laminar flow and FIG. 3B represents a turbulent flow.

Both profiles have the same maximum flow velocity Vmax. In FIG. 3A the flow velocities VL form a parabolic boundary layer which corresponds to a laminar flow. In comparison to FIG. 3A, the flow velocities VL in FIG. 3B form a linear boundary layer which corresponds to a turbulent flow.

Figure 4:
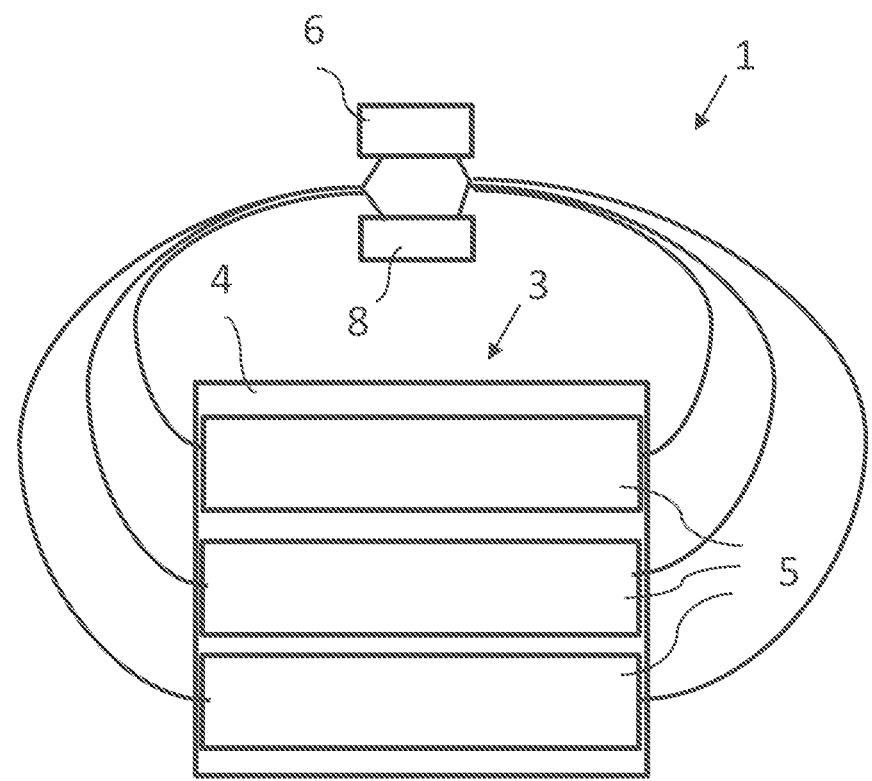
FIG. 4 shows a schematic illustration of a system for determining flow properties of a fluid flowing along a surface according to a further embodiment of the invention; and, FIG. 5 shows a schematic illustration of an aircraft with a thermal flow sensor located on the airfoil of the aircraft according to a further embodiment of the invention.

FIG. 4 shows a schematic illustration of a system 1 for determining flow properties of a fluid flowing along a surface 2. The system 1 comprises a thermal flow sensor 3, a power supply 6 and a measurement assembly 8.

The thermal flow sensor 3 includes a substrate 4 and a heating element 5 mounted onto the substrate 4. The thermal flow sensor 3 is located on the surface 2. The heating element 5 may further have three electrodes which are configured to operate either in an anemometer state when the heating element also serves as a measuring element or in a calorimeter state when one electrode of the heating element is surrounded by two electrodes serving as a measuring element. The electrodes are exemplarily made of nickel. Additionally, the heating element or each of the electrodes has a width in the range of 5 µm to 50 µm and has a thickness of about 200 nm. Thus, the heating element can be stable against external influences.

The substrate 4 can have polyimide, in particular Kapton CR, polybutylene succinate, in particular aerogel, or a similar material which is coated wholly or partially with a metal. Additionally or alternatively, the substrate 4 can be attached to a metal or a composite part of the surface. Optionally, the substrate 4 can be covered by an adhesive for utilizing the attachment to the surface 2. Alternatively, the substrate 4 can be made of a foil material. In addition, the foil material of the substrate 4 can be removed partially or completely below the heating element 5 and replaced with a material having a predefined thermal conductivity. Optionally, the foil material can be formed as a laminate of several thin foils. To increase the thermal conductivity, the substrate 4 can have a conductive or semiconductive film, in particular made of copper or metal, with a predefined thickness below the heating element 5. The thermal flow sensor 3, the substrate 4 and/or the heating element 5 can be manufactured by printed electronics processes. Alternatively or additionally, the heating element 5 can be directly mounted on the surface 2, wherein the surface 2 can be made of a metal, in particular aluminum, a composite material or a similar material, or the surface 2 can be coated with a paint. That means in such a configuration, the substrate 4 is not needed. The heating element 5 can be directly mounted on the surface 2 by aerosol jet printing for example.

For reduced cabling efforts, electronics for local data preprocessing can be integrated in or on the foil. The edges of the thermal flow sensor 3 can be beveled or rounded at least locally for providing a smooth transition of the flow between the surface and the thermal flow sensor 3. For further increasing the mechanical robustness the thermal flow sensor 3 can be covered by a protection layer, in particular made of a diamond-like material, e.g. DLC, glass-filled epoxy material or of a glass-fiber reinforced plastic material. F or instance, the system 1 can withstand curing at a temperature of 160° C. or more, in particular at a temperature of 180-200° C., for more than two hours.

Preferably, the substrate 4 has a thickness of 100 µm or less, in particular a thickness of 90 µm. Moreover, the thermal conductivity of the substrate 4 is 0.3 W/mK or less, in particular around 0.2 W/mK for example.

The power supply 6 is electronically coupled to the thermal flow sensor 3 and configured to modulate the current through the heating element 5 of the thermal flow sensor 3 located on the surface 2 with at least one modulation frequency. The thermal flow sensor 3, in particular its heating element 5, emits a thermal wave 7 into the fluid flowing along the surface 2, wherein the thermal wave 7 has a penetration depth L inversely proportional to the modulation frequency $\omega$.

Further, the measurement assembly 8 is electronically coupled to the thermal flow sensor 3 and configured to measure an amplitude $U3\omega$ of a voltage U across the heating element 5 at the third harmonic $3\omega$ of the at least one modulation frequency $\omega$. Thereby, the voltage U depends on the thermal conductivity and the volumetric heat capacity of the fluid flowing along the surface 2. The measurement of the amplitude $U3\omega$ is for determining a flow velocity VL at the penetration depth L from the attenuation value of the measured amplitude $U3\omega$ of the voltage U, and for estimating whether the flow at the penetration depth L is laminar or turbulent on the basis of the determined flow velocity VL.

Figure 5:
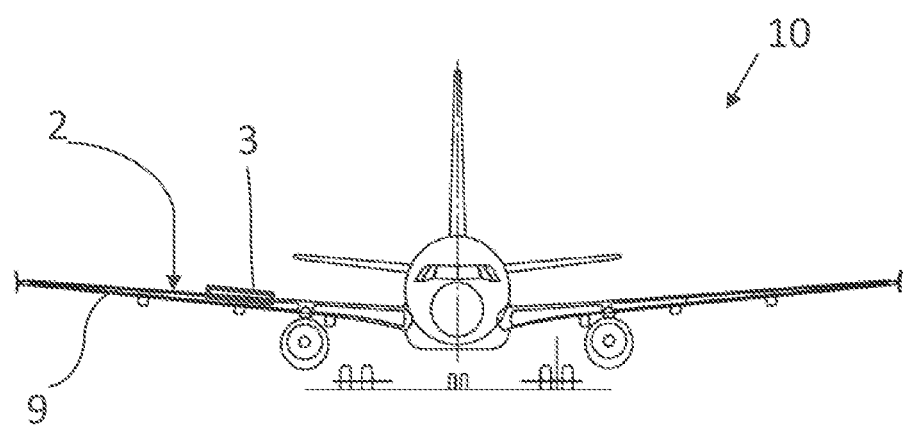

FIG. 5 shows a schematic illustration of an aircraft 10 with a thermal flow sensor 3 located on the airfoil 9 of the aircraft 10.

In this example, the thermal flow sensor 3 is attached to the upper surface of the airfoil 9. Alternatively or additionally, the thermal flow sensor 3 can be attached to the lower surface of the airfoil 9 or any other area of the airfoil 9. The thermal flow sensor 3 can be integrated in a system according to FIG. 4 of the present invention. Thereby, the power supply and/or the measurement assembly of the system may be located inside the aircraft 10. Optionally, the power supply and/or the measurement assembly of the system can be electronically coupled to a plurality of thermal flow sensors 3. For reducing installation costs and/or installation efforts the thermal flow sensor 3 or a part of the thermal flow sensor 3, e.g. the substrate, can already be integrated on the surface 2 the aircraft 10 during manufacturing of the aircraft 10, e.g. during composite curing of the airfoil 9.

The thermal flow sensor 3 is suitable for online monitoring of stall conditions of the aircraft 10. Furthermore, cabling efforts can be reduced. The aircraft 10 with a thermal flow sensor 3 according to the invention can support the pilot of the aircraft 10 by providing real time information about the flow properties of the air flow to operate the aircraft 10 in single pilot operation for example.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

In the detailed description above, various features have been combined in one or more examples in order to improve the rigorousness of the illustration. However, it should be clear in this case that the above description is of merely illustrative but in no way restrictive nature. It serves to cover all alternatives, modifications and equivalents of the various features and exemplary embodiments. Many other examples will be immediately and directly clear to a person skilled in the art on the basis of his knowledge in the art in consideration of the above description.

The exemplary embodiments have been chosen and described in order to be able to present the principles underlying the invention and their application possibilities in practice in the best possible way. As a result, those skilled in the art can optimally modify and utilize the invention and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude the plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 1 system
2 surface
3 thermal flow sensor
4 substrate
5 heating element
6 power supply
7 thermal wave
8 measurement assembly
9 airfoil
10 aircraft
L penetration depth
$T\omega$ wall shear stress vector
U voltage
$U3\omega$ amplitude
VL flow velocity
Vmax maximum flow velocity
$\omega$ modulation frequency
$3\omega$ third harmonic
M method
M1 modulating
M2 measuring
M3 determining
M4 estimating

The invention claimed is:

1. A method for determining flow properties of a fluid flowing along a surface, the method comprising:
   modulating a current through a heating element of a thermal flow sensor located on a surface with at least one modulation frequency, thereby emitting a thermal wave into the fluid flowing along the surface having a penetration depth inversely proportional to the at least one modulation frequency;
   measuring an amplitude of a voltage across the heating element at a third harmonic of the at least one modulation frequency, the voltage depending on a thermal conductivity and a volumetric heat capacity of the fluid flowing along the surface;
   determining a flow velocity at the penetration depth from an attenuation value of the measured amplitude of the voltage; and
   estimating whether a flow at the penetration depth is laminar or turbulent based on the determined flow velocity.

2. The method according to claim 1, wherein estimating whether the flow at the penetration depth is laminar or turbulent comprises:
   comparing the determined flow velocity with a measurement value of a reference sensor or with a calibration value in quiescent atmosphere.

3. The method according to claim 1, wherein the current through the heating element of the thermal flow sensor located on the surface is modulated with a plurality of modulation frequencies, and
   wherein a plurality of amplitudes of the voltage across the heating element are measured at respective third harmonics of the plurality of modulation frequencies.

4. The method according to claim 3, wherein a flow velocity profile is determined from flow velocities at different penetration depths based on the attenuation value of the plurality of measured amplitudes.

5. The method according to claim 4, wherein estimating whether the flow at the penetration depth is laminar or turbulent includes estimating a transition point between laminar and turbulent flow in the flow velocity profile.

6. The method according to claim 5, wherein estimating the transition point between laminar and turbulent flow in the flow velocity profile includes deriving a threshold of a wall shear stress vector near the surface.

7. The method according to claim 3, wherein the current through the heating element is modulated with the plurality of modulation frequencies simultaneously.

8. The method according to claim 3, wherein the at least one modulation frequency of the current through the heating element is swept through the plurality of modulation frequencies.

9. The method according to claim 1, wherein measuring the amplitude of the voltage across the heating element comprises using a lock-in amplifier at the third harmonic of the at least one modulation frequency.

10. The method according to claim 1, wherein a modulation pattern of the current through the heating element is a sawtooth modulation, a triangular modulation, a square-wave modulation, a stepped modulation, or a sinusoidal modulation.

11. The method according to claim 1, wherein the surface comprises a surface of an aircraft.

12. A system for determining flow properties of a fluid flowing along a surface, the system comprising:
 a thermal flow sensor comprising a substrate and a heating element mounted onto the substrate, the thermal flow sensor located on a surface;
 a power supply electronically coupled to the thermal flow sensor and configured to modulate a current through the heating element of the thermal flow sensor with at least one modulation frequency, thereby emitting a thermal wave into the fluid flowing along the surface having a penetration depth inversely proportional to the at least one modulation frequency; and
 a measurement assembly electronically coupled to the thermal flow sensor and configured to measure an amplitude of a voltage across the heating element at a third harmonic of the at least one modulation frequency, the voltage depending on a thermal conductivity and a volumetric heat capacity of the fluid flowing along the surface, to determine a flow velocity at the penetration depth from an attenuation value of the measured amplitude of the voltage, and to estimate whether a flow at the penetration depth is laminar or turbulent based on the determined flow velocity.

13. The system according to claim 12, wherein the heating element is formed as at least one conductive or semiconductive film partially or wholly coating the substrate of the thermal flow sensor.

14. The system according to claim 12, wherein the substrate of the thermal flow sensor comprises polyimide with a thickness of 100 µm or less.

15. The system according to claim 12, wherein the thermal flow sensor further includes a protection layer on top of the heating element.

16. An aircraft comprising:
 a thermal flow sensor comprising a substrate and a heating element mounted onto the substrate, the thermal flow sensor located on a surface;
 a power supply electronically coupled to the thermal flow sensor and configured to modulate a current through the heating element of the thermal flow sensor with at least one modulation frequency, thereby emitting a thermal wave into the fluid flowing along the surface having a penetration depth inversely proportional to the at least one modulation frequency; and
 a measurement assembly electronically coupled to the thermal flow sensor and configured to measure an amplitude of a voltage across the heating element at a third harmonic of the at least one modulation frequency, the voltage depending on a thermal conductivity and a volumetric heat capacity of the fluid flowing along the surface, to determine a flow velocity at the penetration depth from an attenuation value of the measured amplitude of the voltage, and to estimate whether a flow at the penetration depth is laminar or turbulent based on the determined flow velocity.

17. The aircraft according to claim 16, wherein the surface comprises a surface of an airfoil.

* * * * *